United States Patent
Butler et al.

(10) Patent No.: US 6,769,858 B1
(45) Date of Patent: Aug. 3, 2004

(54) METHOD AND APPARATUS FOR LOADING CARGO ON AN ATV

(76) Inventors: Adron E. Butler, 479 Butch Butler Rd., Rayville, LA (US) 71269; Jason Nealy, 154 Egypt, Mangham, LA (US) 71259

(\*) Notice: Subject to any disclaimer, the term of this patent is extended or adjusted under 35 U.S.C. 154(b) by 213 days.

(21) Appl. No.: 10/143,471

(22) Filed: May 9, 2002

(51) Int. Cl.[7] .................................................. B60P 1/14
(52) U.S. Cl. ...................... 414/462; 414/471; 414/495; 414/500; 414/540; 414/812
(58) Field of Search ................................. 414/462, 471, 414/495, 500, 540, 812

(56) References Cited

U.S. PATENT DOCUMENTS

| | | | |
|---|---|---|---|
| 4,775,282 A | \* 10/1988 | Van Vliet | .................... 414/462 |
| 5,011,361 A | 4/1991 | Peterson | |
| 5,363,925 A | 11/1994 | Gallagher | |
| 5,540,537 A | 7/1996 | Welch | |
| 5,567,107 A | 10/1996 | Bruno et al. | |
| 5,662,451 A | 9/1997 | Muzzi et al. | |
| 5,788,095 A | 8/1998 | Watson | |
| 5,791,858 A | 8/1998 | Sasser | |
| 5,911,556 A | 6/1999 | Caldwell | |
| 5,964,565 A | 10/1999 | Skotzky | |
| 5,975,831 A | 11/1999 | Martin | |
| 6,017,018 A | 1/2000 | Langdon | |
| 6,109,855 A | 8/2000 | Vela-Cuellar | |
| 6,138,991 A | 10/2000 | Myers, Jr. | |
| 6,155,771 A | 12/2000 | Montz | |
| 6,250,483 B1 | 6/2001 | Frommer | |
| 6,276,698 B1 | 8/2001 | Calandra | |
| 6,312,210 B1 | 11/2001 | Lang | |
| 6,609,481 B1 | \* 8/2003 | McCarty | ...................... 119/843 |
| 2004/0018076 A1 | \* 1/2004 | Poindexter | .................. 414/477 |

\* cited by examiner

Primary Examiner—Janice L. Krizek
(74) Attorney, Agent, or Firm—Robert N. Montgomery

(57) ABSTRACT

An electrically operated, compact, loader apparatus adaptable to a vehicle such as a truck bed of a cargo rack of an ATV, including a self deploying and recovery load platform and a folding telescopic mast that lies flat on the cargo rack of a truck bed or ATV allowing other cargo to be carried on top of the loader.

18 Claims, 5 Drawing Sheets

METHOD AND APPARATUS FOR LOADING CARGO ON AN ATV

SPECIFICATION

1. Background of the Invention

The present invention generally relates to cargo loading devices adapted for attachment to an all terrain vehicle (ATV) and more particularly to a method and apparatus for a folded, electrically operated, self-erecting loader for lifting and transporting a variety of cargo.

2. Description of the Prior Art

For many years hunters, farmer, cattlemen, etc., have used ATV's for hunting, recreation, and work. The ATV allows a rider to travel great distances over a verity of terrain. The popularity of these vehicles also has generated enthusiasm among women, children, and the handicapped; thereby opening the great outdoors to many whom would otherwise not be capable of enjoying nature in the wilderness. ATV users often are alone when faced with the need to transport heavy loads for great distances over rough terrain. For this reason, a new loading device is needed to allow practically any individual, regardless of physical ability, to load and transport heavy cargo, such as wild game, feed, heavy equipment, and hunting supplies, to and from the field.

Apparatus have been developed for attachment to the cargo racks of ATVs or truck beds for loading, skinning, and transporting game animals. However, such apparatus tend to be bulky, mechanically operated mechanisms which interfere with the normal operation of the vehicle and require significant agility to operate or limit use to a particular task. While these devices make it possible to lift and /or load a large game animal onto an ATV, they are in most cases cumbersome requiring disassembly, re-assembly, pulling pins, adjusting, and repositioning parts, etc. There is, therefore, a need for an apparatus adaptable to the cargo rack of most ATVs that allows the ATV user to load and transport virtually any type of heavy cargo, within the limits of the weight capacity of the vehicle, without denying access to the cargo rack or interfering with the day to day operation of the vehicle. There is a further need for a loading apparatus adaptable to ATVs that is electrically operated and fully self erecting.

SUMMARY

The present invention addresses the above deficiencies and needs by providing an apparatus adaptable to the cargo rack of an ATV that is both compact and self-erecting. The loading apparatus includes a base plate or platform for supporting loads and a folding telescopic mast that is electrically operated, thereby allowing the user to unfold the loader to the loading position by simply activating an electric winch. When a load is positioned onto the loading platform, the user activates the electric winch, lifting the load clear of the ground for transport. When the load is removed, the user again activates the winch and the mast automatically telescopes and folds up and over onto the cargo rack of the ATV and the ATV is thereby ready for conventional use. The loading apparatus is very compact and lies flat on the cargo rack of the ATV allowing other cargo, such as ice chest, deer stands, etc., to be carried on top of the loader.

DETAILED DESCRIPTION OF THE INVENTION

Figure 3:
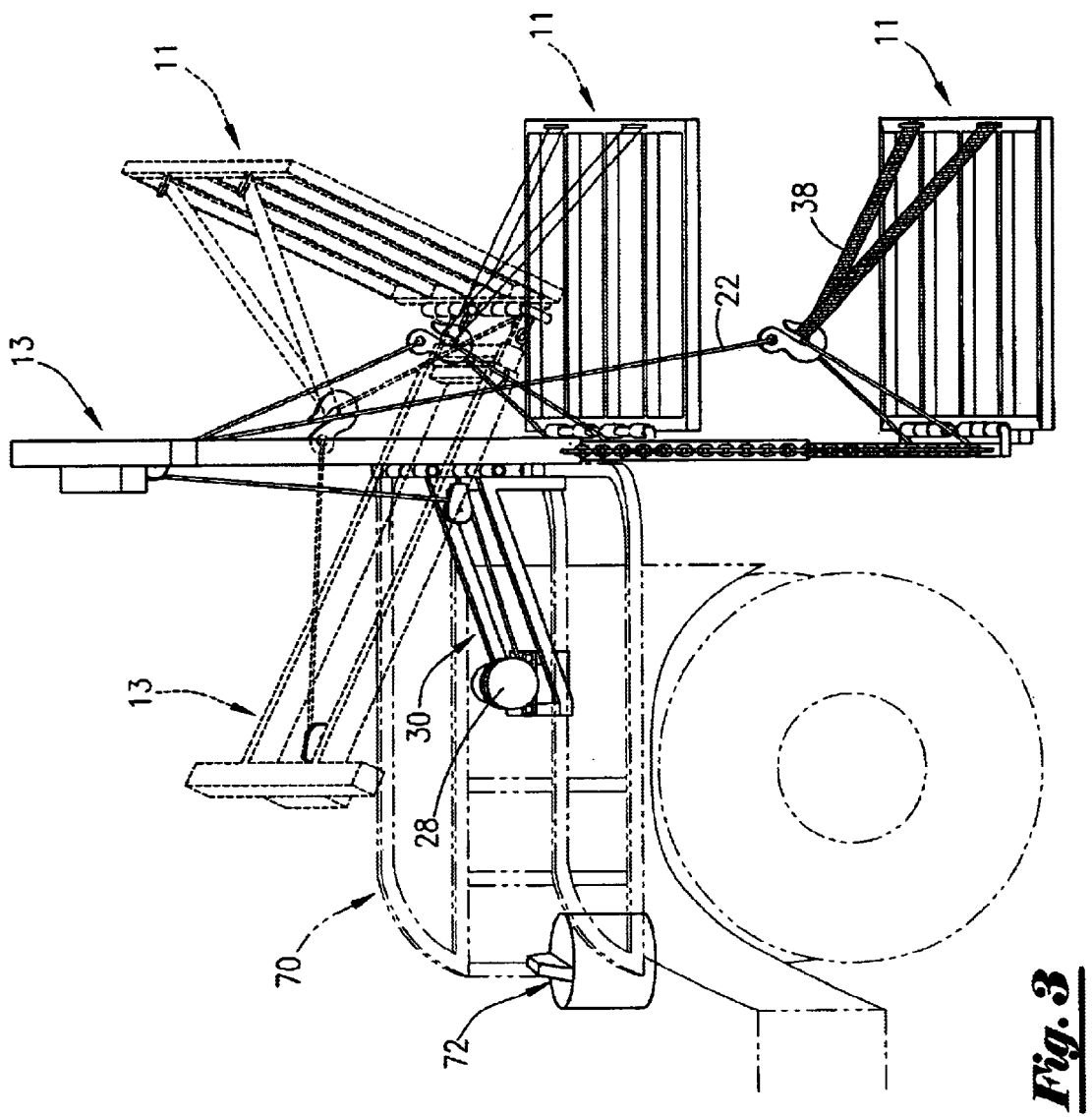
FIG. 3 is an isometric side illustration of the loader illustrating the folding movement of the loader.
Figure 4:
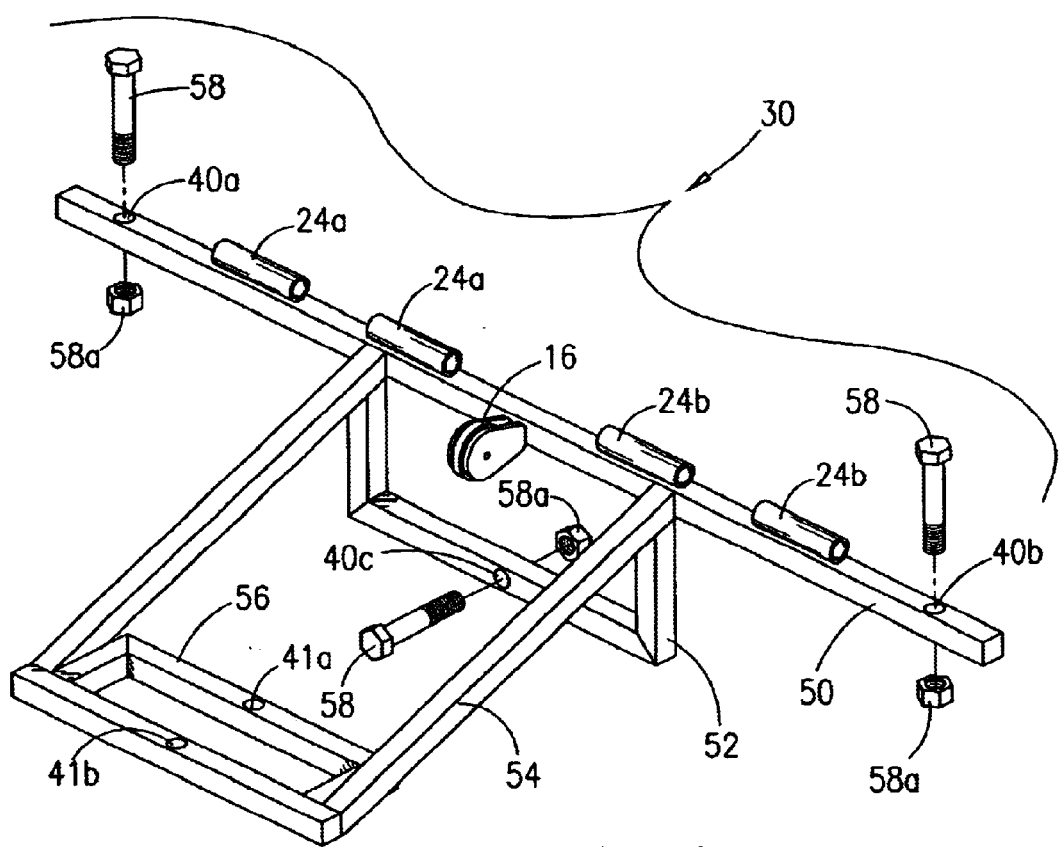
FIG. 4 is an isometric view of the winch and mounting support bracket.

Referring now to the drawings, we see the ATV loader 10 consists principally of a loading platform 11, a telescopic mast assembly 13, and a mounting base support frame 30. The mounting base support frame bracket 30, best seen in detail in FIG. 4, is constructed of structural tubing and includes a horizontal bar frame member 50 having a first "U" shaped tubular frame member 52 centrally attached perpendicularly thereto midway along its length, a second "U" shaped tubular frame member 54 centrally attached at an acute angle to the first "U" shaped frame member 52, and a third "U" shaped tubular frame member 56 attached at an acute angle to a lower portion of the "U" shaped frame member 54. Mounting bolt holes 40a, 40b are provided in the horizontal bar frame member 54 for attachment to the upper rail of an ATV cargo rack 70 with bolts 58 and nuts 58a. A stabilizing bolt hole 40c is also provided in frame member 52 for attachment to the lower rail of the ATV cargo rack 70 with a bolt 58 and nut 58a. The frame elements 54 and 56 provide support for a 12-volt electric winch 28 secured by two bolts through holes 41a and 41b. A remote electrical switch 72 for operating the winch 28 is also provided as seen in FIG. 3

Figure 5:
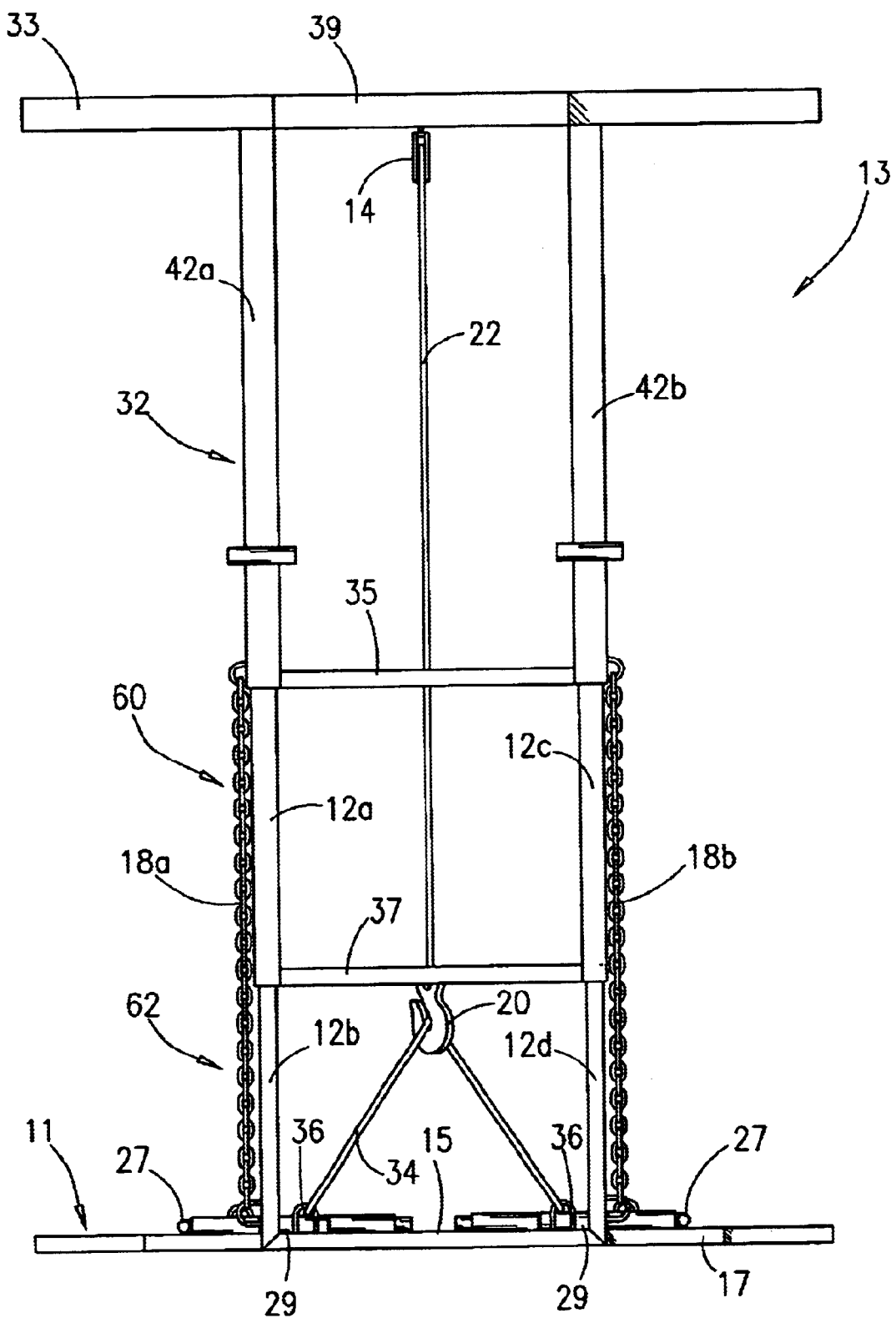
FIG. 5 is a rear elevation view of the loader showing the telescoping mast in the extended position.

The horizontal bar frame member 50 is also fitted with two pair of tubular pivotal clips 24a, 24b attached along the upper edge for pivotal connection to the mast assembly 13. A cable pulley 16 is also centrally attached to the horizontal bar 50. The mast assembly 13, seen detailed in FIG. 5, is composed of three stage telescopic sections, a first or receiver section 32 composed of a horizontal header member 33 having a pair of spaced a part tubular legs 42a, 42b attached perpendicular thereto midway along the header member 33, a spacer member 35 located adjacent the ends of the legs 42a, 42b, and a doubling channel 39 incasing the header member 33 located between the legs 42a, 42b. A cable pulley 14 also is centrally attached to the header member and its doubling channel at its mid point. The second stage 60 is composed of a pair of tubular legs 12a, 12c slidable within the receiver stage's tubular legs 42a, 42b and held in a spaced apart manner by a spreader member 37 located adjacent their exposed ends.

The third stage 62 is composed of a pair of tubular legs 12b, 12d slidable within the second stage's 60 tubular legs 12a, 12c and held in a spaced apart manner by a spreader bar 15 and a tubular foot bar member 17 located adjacent their exposed ends. The foot bar member 17 also is fitted with a pair of tubular hinge members 29 for pivotal connection with the load platform 11 and a pair of lifting eyelets 36 located between the legs 12b, 12d attached to the spreader bar 15. Retaining chains 18a, 18b are attached at one end to each side of each the receiver legs 42a, 42band the other end to each of the third stage telescopic legs 12b, 12d along the outside of the legs at a point adjacent the spreader bar 15 and fastened externally intermediately to the second stage telescopic legs 12a, 12c at a point along the outside of the leg adjacent the spreader bar 37.

Figure 6:
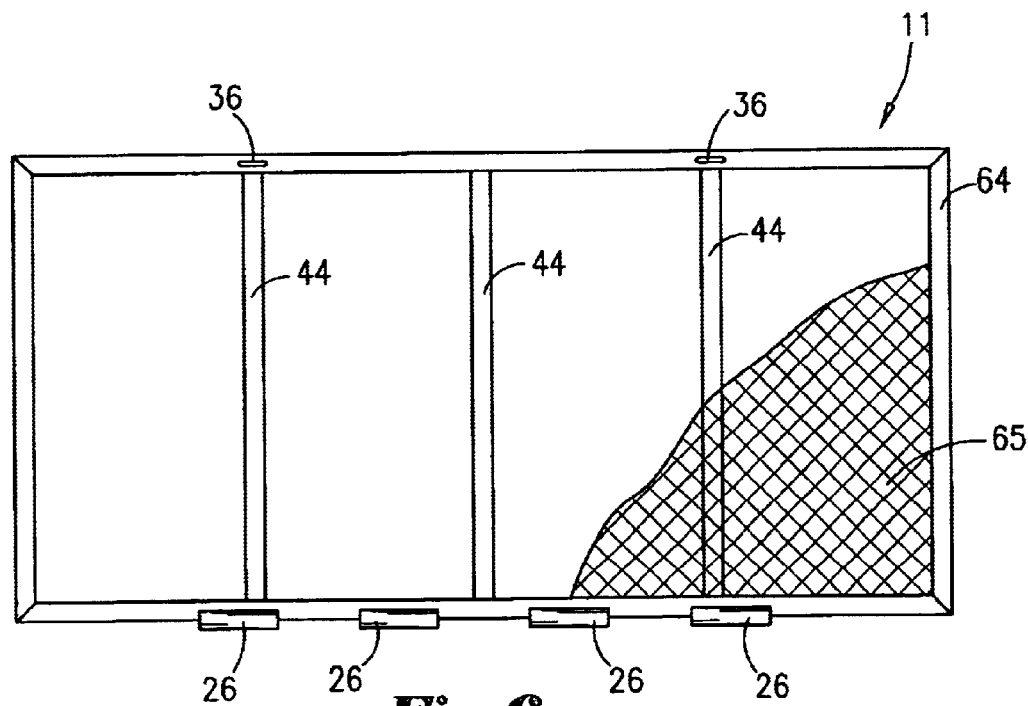
FIG. 6 is a top view of the loading platform.

The load or lifting platform 11, as detailed in FIG. 6, is composed of a rectangular tubular frame 64 interspersed with partition members 44 with an expanded metal deck 65. Tubular hinge clips 26 are located along the outside of one of the long sides of the rectangular frame for pin connection with the clips 29 located on the foot member 17 of the third section 62 of the mast 13. Eyelets 36 also are provided attached to the long side of rectangular frame 64 opposite the hinge clips 26 for attaching lifting cables, de downs, etc. The loading platform is attached to the foot bar clips 29 of the mast by inserting hinge pin 27 through hinges 26 of the loading platform and hinge clips 29.

Figure 1:
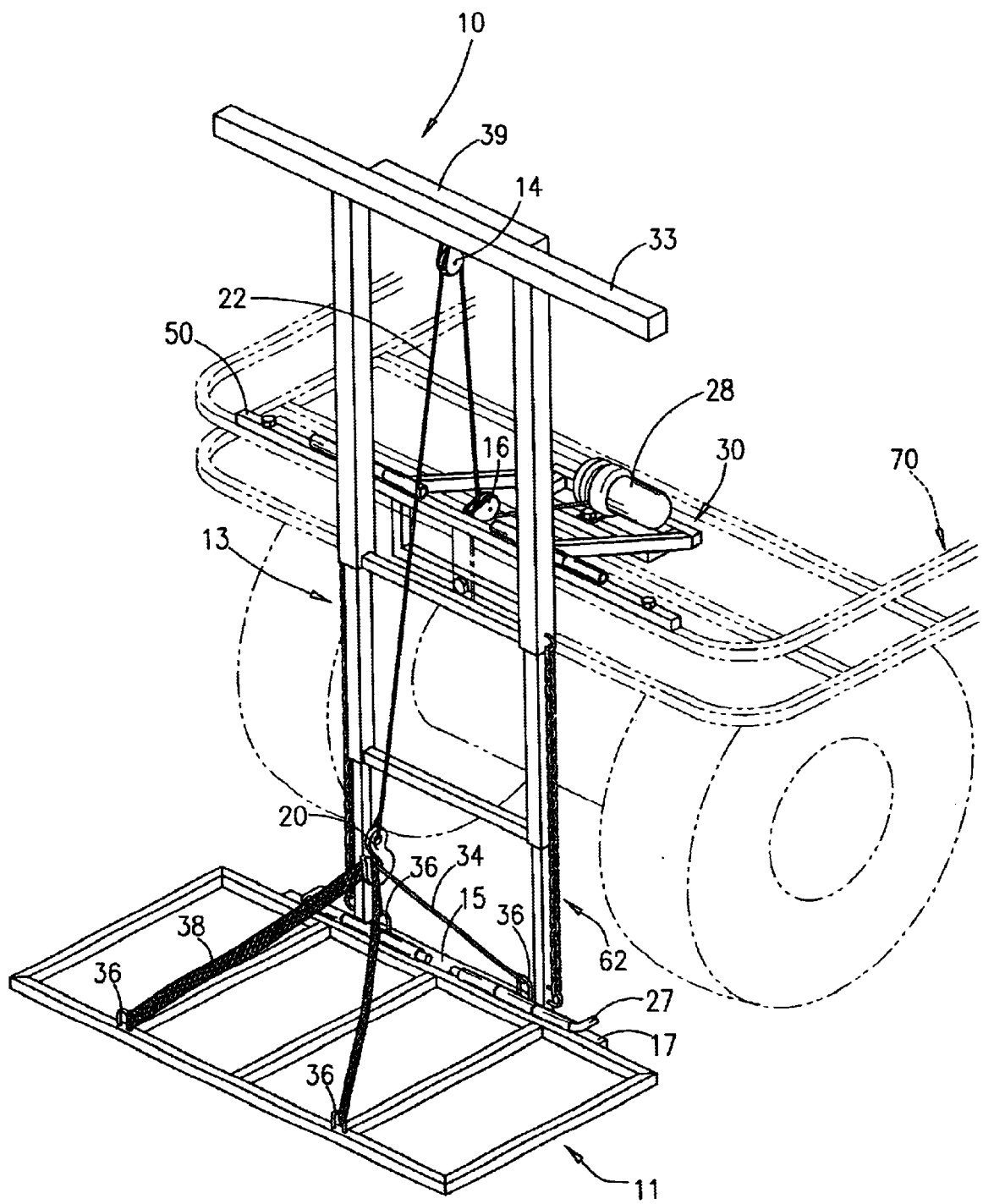
FIG. 1 is an isometric illustration of the loader in the erect loading position.

As seen In FIG. 1, a steel cable 34 is secured to the pair of loops 36 on cross member 15 to form a loop. The winch cable 22 runs from the winch 28, as seen in FIG. 1, and is threaded through the pulley 16 located on the mounting base frame member 50 and the pulley 14 located on the header bar 33 and is connected to the hook 20 at the end of the winch cable 22.

Figure 2:
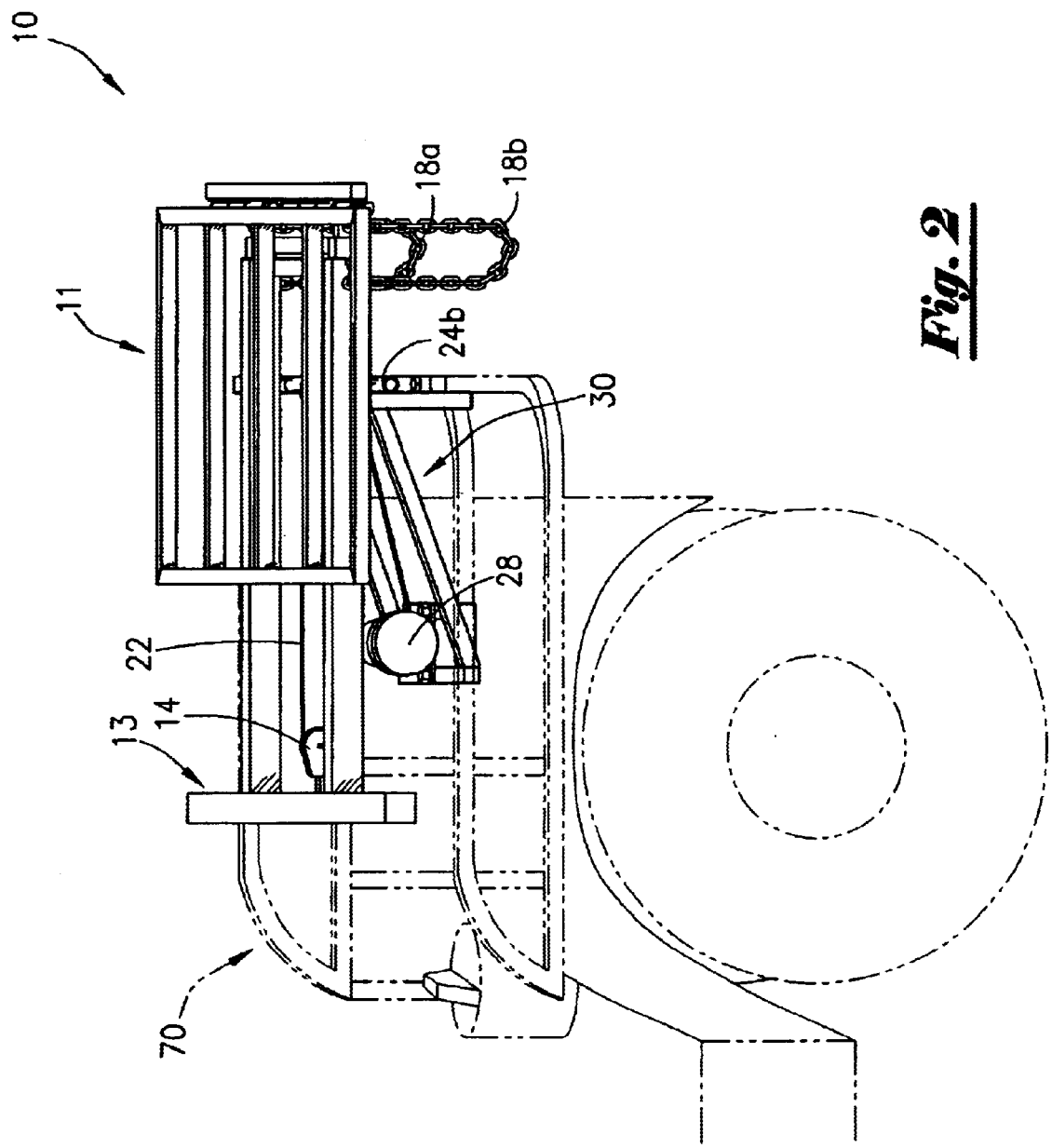
FIG. 2 is an isometric illustration of the loader in the folded position.

A length of cable 34 threaded through eyelets 36 secured to the spreader bar 15 at the footer bar 17 of the mast 13 is connected to form a continuous loop or bridle. An adjustable belt 38 is attached to eyelets 36 located on the loading platform 11, also forming a loop. The winch cable hook 20 is quick coupled to both the cable loop 34 and the belt 38, thereby forming a four-point lift connection. When the winch cable 22 is retracted by reversing the winch, the telescopic mast 13 is drawn upwards as illustrated in FIG. 3, thereby collapsing the mast sections and folding the mast 13 inward over the top of the ATV cargo rack 70 and into a folded or storage position. It should be noted that as the mast tilts over the cargo rack 70, the load platform 11 pivots inwardly as well, thereby folding down over the mast 13 to the position illustrated in FIG. 2.

To deploy the loader, the electric winch expels the cable from the winch reel allowing the over center weight of the folded loader 10 to tilt toward the rear. As the cable 22 pays out, the telescopic sections extend and the load platform 11 deploys until the load platform 11 rests on the ground as seen fully deployed in FIG. 1.

When loading, the operator of the ATV backs the vehicle up to the object to be loaded. The loader is deployed as stated above. The operator then rolls or otherwise places the object to be transported onto the loading platform and secures it in place on the platform 11 with the adjustable belt 38, as seen in FIG. 1. The adjustable, flexible nylon tie down strap or belt 38 serves to hold the load in place and is looped through the hook 20 of the winch cable 22 and hooked to the bridle or loop 34 secured to the base section 62 of the telescopic mast 13. The hunter now uses the forward or retracting mode of the electric winch, forcing the mast to telescope upward until the load is either securely positioned clear of the ground or the load's weight is transferred from the platform at least in part to the ATV's cargo rack 70. The load may then be transported.

Although the load lifting apparatus depicted in the Figures herein is preferably adaptable to an ATV, it is recognized that the adapter bracket could be easily adapted to the bed of a pick-up truck or other type of vehicles where assistance may be needed in loading relatively heavy cargo. It also is anticipated that a quick disconnect system may be utilized for mounting and dismounting the apparatus. Further, it would be obvious that an electronic remote control unit could be used to operate the electric winch, as would other optional safety equipment such as load sensors, etc. Many varying and different embodiments may be made within the scope of the inventive concept herein taught and, because many modifications may be made in the embodiments herein detailed in accordance with the descriptive required of the law, it is to be understood that the details herein are to be interpreted as illustrated and not in any limiting sense.

What is claimed is:

1. A load lifting apparatus adaptable to an ATV comprising:
    a) a frame bracket adapted for attachment to an ATV cargo rack;
    b) an electric winch mounted to said frame bracket;
    c) a telescopic, dual column mast assembly having a plurality of telescopic sections, the upper section of which is pivotally attached to said frame bracket in a manner whereby said mast assembly is pivotal between a vertical and horizontal position;
    d) a load platform pivotally attached to said telescopic mast assembly in a manner whereby said platform folds parallel to said mast assembly;
    e) a bridle connected to a lower portion of said mast assembly;
    f) an adjustable, flexible strap attached to said platform; and
    g) a cable extending from said electric winch threaded through a plurality of pulleys, quick connectable to said bridle and said flexible strap.

2. The load lifting apparatus according to claim 1 wherein said sections of said telescopic mast are retained one to another by external flexible members.

3. The load lifting apparatus according to claim 1 further comprising a header bar attached to and extending perpendicular to said mast in a manner whereby said header bar contacts an upper portion of each side of said cargo rack, thereby supporting and bracing said mast in the horizontal position.

4. The load lifting apparatus according to claim 1 wherein said platform is a tubular frame having an expanded metal deck.

5. The load lifting apparatus according to claim 4 wherein said platform becomes a cargo rack when the mast assembly is in the horizontal position.

6. The load lifting apparatus according to claim 1 wherein said lifting apparatus folds onto itself in a horizontal plane and is fully supported by said ATV cargo rack.

7. The load lifting apparatus according to claim 6 wherein said lifting apparatus is self-erecting and self-collapsing for transport.

8. The load lifting apparatus according to claim 6 wherein a portion of said mast assembly and said platform extend over the edge of said cargo rack in said folded horizontal plane.

9. A self-erecting and folding load lifting apparatus adaptable to an ATV comprising:
    a) a frame bracket adapted for attachment to an ATV cargo rack;
    b) an electric winch mounted to said frame bracket;
    c) a control means for electrically operating said winch;
    d) a telescopic, dual column mast assembly having a plurality of telescopic sections, the upper section of which is pivotally attached to said frame bracket in a manner whereby said mast assembly is pivotal between a vertical and horizontal position;
    e) a load platform pivotally attached to said telescopic mast assembly in a manner whereby said platform folds parallel to said mast assembly;

f) a bridle connected to a lower portion of said mast assembly;

g) an adjustable, flexible strap attached to said platform; and h) a cable extending from said electric winch, threaded through a plurality of pulleys, quick connectable to said bridle and said flexible strap.

10. The load lifting apparatus according to claim 9 wherein a portion of said mast assembly and said platform extends over the edge of said cargo rack when said mast assembly is in said horizontal position.

11. The load lifting apparatus according to claim 9 wherein said sections of said telescopic mast assembly are retained one to another by external flexible members.

12. The load lifting apparatus according to claim 9 further comprising a header bar attached to and extending perpendicular to said mast assembly in a manner whereby said header bar contacts an upper portion of each side of said cargo rack, thereby supporting and bracing said mast assembly in the horizontal position.

13. The load lifting apparatus according to claim 9 wherein said platform is a tubular frame having an expanded metal deck.

14. The load lifting apparatus according to claim 13 wherein said platform becomes a cargo rack when the mast assembly is in the horizontal position.

15. A method of lifting and transporting a heavy load with an ATV comprising the steps of:

a) attaching a lifting apparatus comprising:
  i) a frame bracket adapted for attachment to an ATV cargo rack having upper and lower rail members;
  ii) an electric winch mounted to said frame bracket;
  iii) a telescopic, dual column mast assembly having a plurality of telescopic sections, the upper section of which is pivotally attached to said frame bracket in a manner whereby said mast assembly is pivotal between a vertical and horizontal position;
  iv) a load platform pivotally attached to said telescopic mast assembly in a manner whereby said platform folds parallel to said mast assembly;
  v) a bridle connected to a lower portion of said mast assembly;
  vi) an adjustable, flexible strap attached to said platform; and
  vii) a cable extending from said electric winch threaded through a plurality of pulleys, quick connectable to said bridle and said flexible strap; and b) activating said winch, thereby releasing said cable in a controlled manner allowing the weight of said mast assembly and said load platform to tilt rearwardly in a pivotal manner about said upper rail member, thereby deploying said mast assembly until said mast sections are telescopically deployed and said platform rests in a horizontal plane on ground directly below said ATV cargo rack;

c) placing a load on said platform;

d) reversing the operation of said winch, thereby lifting said platform and said load clear of ground level prior to transport with said ATV;

e) activating said winch, thereby lowering said mast assembly and said platform to ground level and removing said load;

f) reversing the operation of said winch until said telescopic sections are retracted and said mast assembly and said platform are again pivotally rotated over said upper rail member and secured to said cargo rack in a collapsed horizontal plane for transport.

16. The method according to claim 15 further comprising the step of utilizing said flexible strap for securing said load to said platform in combination with lifting said platform.

17. A method for lifting and transporting a load with a motor vehicle comprising the steps of:

a) attaching a lifting apparatus comprising:
  i) a frame bracket adapted for attachment to said motor vehicle;
  ii) an electric winch mounted to said frame bracket;
  iii) a telescopic, dual column mast assembly having a plurality of telescopic sections, the upper section of which is pivotally attached to said frame bracket in a manner whereby said mast assembly is pivotal between a vertical and horizontal position;
  iv) a load platform pivotally attached to said telescopic mast assembly in a manner whereby said platform folds parallel to said mast assembly;
  v) a bridle connected to a lower portion of said mast assembly;
  vi) an adjustable, flexible strap attached to said platform; and
  vii) a cable extending from said electric winch threaded through a plurality of pulleys, quick connectable to said bridle and said flexible strap; and b) activating said winch, thereby releasing said cable in a controlled manner allowing the weight of said mast assembly and said load platform to tilt rearwardly in a pivotal manner about said frame bracket thereby deploying said mast assembly until said mast sections are telescopically deployed and said platform rests in a horizontal plane on ground directly below said motor vehicle;

c) placing a load on said platform;

d) reversing the operation of said winch; thereby lifting said platform and said load dear of ground level prior to transport with said motor vehicle;

e) activating said winch, thereby lowering said mast and said platform to ground level and removing said load; and f) reversing the operation of said winch until said telescopic sections are retracted and said mast assembly and said platform are again pivotally rotated over said frame bracket and secured in a collapsed horizontal plane for transport.

18. The method according to claim 17 further comprising the step of raising said load until said mast assembly pivots horizontally over said frame bracket and said load is in a horizontal plane for transfer from said lifting apparatus to said vehicle.

* * * * *